United States Patent
Lecomte

(10) Patent No.: US 10,101,230 B2
(45) Date of Patent: Oct. 16, 2018

(54) REDUCTION OF NON-LINEARITY ERRORS IN AUTOMOTIVE PRESSURE SENSORS

(71) Applicant: Sensata Technologies, Inc., Attleboro, MA (US)

(72) Inventor: Norman Lecomte, West Greenwich, RI (US)

(73) Assignee: Sensata Technologies, Inc., Attleboro, MA (US)

(*) Notice: Subject to any disclaimer, the term of this patent is extended or adjusted under 35 U.S.C. 154(b) by 243 days.

(21) Appl. No.: 14/855,421

(22) Filed: Sep. 16, 2015

(65) Prior Publication Data

US 2017/0074740 A1 Mar. 16, 2017

(51) Int. Cl.
| | |
|---|---|
| *G01L 7/00* | (2006.01) |
| *G01L 9/00* | (2006.01) |
| *G01L 11/00* | (2006.01) |
| *G01L 13/00* | (2006.01) |
| *G01L 19/00* | (2006.01) |
| *G01L 21/00* | (2006.01) |
| *G01L 21/02* | (2006.01) |
| *G01N 7/00* | (2006.01) |
| *G01L 9/12* | (2006.01) |
| *G01L 27/00* | (2006.01) |

(52) U.S. Cl.
CPC .............. *G01L 9/12* (2013.01); *G01L 9/0075* (2013.01); *G01L 27/002* (2013.01)

(58) Field of Classification Search
CPC ...... H04J 11/005; H04J 11/0036; H04J 13/16; G01R 19/16571; G01R 35/00
See application file for complete search history.

(56) References Cited

U.S. PATENT DOCUMENTS

| | | | | |
|---|---|---|---|---|
| 5,792,957 | A * | 8/1998 | Luder ................... | G01L 9/0075 361/283.4 |
| 6,631,645 | B1 * | 10/2003 | Satou .................... | G01L 9/0073 73/718 |
| 7,825,837 | B1 * | 11/2010 | Khasnis .............. | H03M 1/1014 341/118 |
| 2006/0213269 | A1 * | 9/2006 | Ruohio ................. | G01L 9/0073 73/514.32 |
| 2014/0037909 | A1 * | 2/2014 | Hawwa ................. | G01L 9/0072 428/172 |

FOREIGN PATENT DOCUMENTS

CA 2681014 10/2008

* cited by examiner

*Primary Examiner* — Roy Y Yi

(74) *Attorney, Agent, or Firm* — Burns & Levinson LLP; Joseph M. Maraia; George N. Chaclas

(57) ABSTRACT

Methods and apparatus for reduction of non-linearity errors in automotive pressure sensors. A pressure sensor includes a pressure sensing element including a pair of parallel electrodes, a pair of ceramic plates, rigid glass seals and a connection between the pair of parallel electrodes and an integrated circuit (IC). The IC executes a linear mapping function of a $1/C_X$ value after a $C_X$ value is captured from the pressure sensing element, C representing a capacitance, the linear mapping function reducing a non-linearity error to enable two point calibration of a relationship between pressure and capacitance.

2 Claims, 1 Drawing Sheet

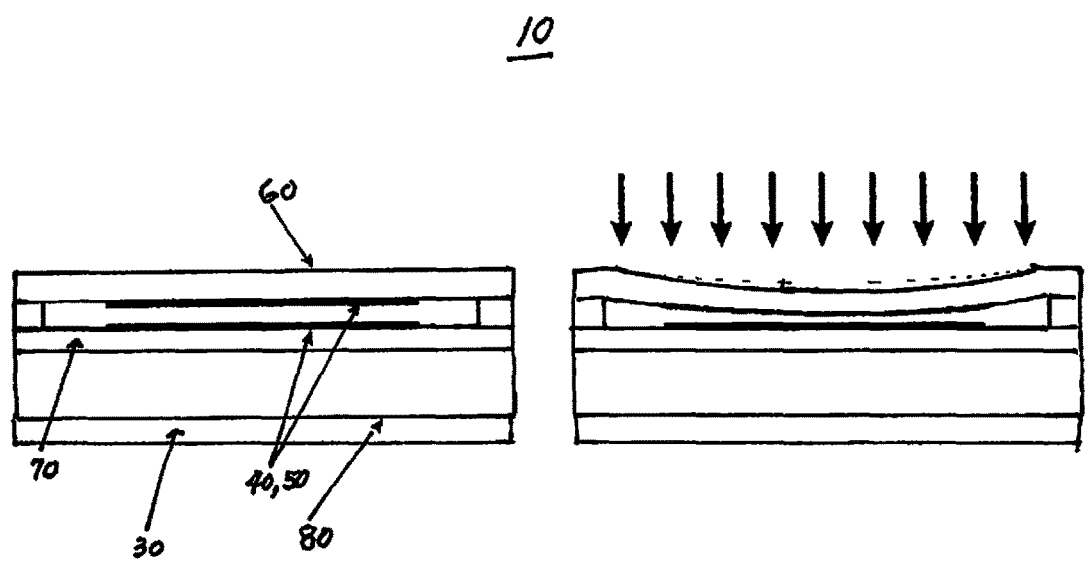

REDUCTION OF NON-LINEARITY ERRORS IN AUTOMOTIVE PRESSURE SENSORS

BACKGROUND OF THE INVENTION

The invention relates generally to sensors, and more specifically to reduction of non-linearity errors in automotive pressure sensors.

Pressure sensors are widely used in automotive systems. In general, an automotive pressure sensor (APT) is a capacitive-based sensor that provides a linear voltage output directly proportional to applied pressure. Because of the construction of a capacitive pressure element, and particularly a parallel plate configuration, capacitance to voltage or digital conversion may lead to significant non-linearity errors.

What is a needed is a method that reduces APT non-linearity.

SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention provides methods and apparatus for reduction of non-linearity errors in automotive pressure sensors.

In one aspect, the invention features a pressure sensor including a pressure sensing element including a pair of parallel electrodes, a pair of ceramic plates, rigid glass seals and a connection between the pair of parallel electrodes and an integrated circuit (IC), the IC executing a linear mapping function of a $1/C_X$ value after a $C_X$ value is captured from the pressure sensing element, C representing a capacitance, the linear mapping function reducing a non-linearity error to enable two point calibration of a relationship between pressure and capacitance.

In another aspect, the invention features pressure sensor including a pressure sensing element including a pair of parallel electrodes, a ceramic diaphragm plate and a ceramic substrate plate, rigid glass seals and a connection between the pair of parallel electrodes and an integrated circuit (IC), the IC executing a linear mapping function of a $1/C_X$ value after a $C_X$ value is captured from the pressure sensing element, C representing a capacitance, the linear mapping function reducing a non-linearity error to enable two point calibration of a relationship between pressure and capacitance.

In another aspect, the invention features an integrated circuit (IC)) including a linear mapping function of a $1/C_X$ value after a $C_X$ value is captured from a pressure sensing element, C representing a capacitance, the linear mapping function reducing a non-linearity error to enable two point calibration of a relationship between pressure and capacitance.

Embodiments may have one or more of the following advantages.

The pressure transducer of the present invention reduces non-linearity associated with a hardware conversion of capacitance.

The pressure transducer of the present invention reduces a non-linearity error associated with a hardware conversion of capacitance to enable a two point calibration of a relationship between pressure and capacitance.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The invention will be more fully understood by reference to the detailed description, in conjunction with the following figures, wherein:

FIG. 1 illustrates an exemplary pressure transducer.

DETAILED DESCRIPTION

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

In the description below, the term "or" is intended to mean an inclusive "or" rather than an exclusive "or." That is, unless specified otherwise, or clear from context, "X employs A or B" is intended to mean any of the natural inclusive permutations. That is, if X employs A, X employs B, or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As shown in FIG. 1, an exemplary pressure transducer 10, such as those manufactured by Sensata Technologies of Attleboro, Mass., is part of a sensor device (not shown) that performs a conversion of a measured parameter (e.g., pressure) into a measurable unit (e.g., capacitance). As used herein, such a pressure transducer is generally referred to as a pressure sensing element.

The pressure sensing element 10 includes a pair of parallel electrodes 40, 50, a pair of ceramic plates (substrate (70) and diaphragm (60)), rigid glass seals (shown at the edges of the diaphragm 60 between diaphragm 60 and substrate 70) and a connection (not shown) between the electrodes 40, 50 and an integrated circuit (IC) 30.

The integrated circuit (IC) 30 in the transducer 10 measures a capacitance and converts it to a voltage linearly proportional to the pressure. Since this IC 30 can detect very small changes in capacitance due to small diaphragm deflections, excellent hysteresis and repeatability are achieved.

The IC 30 typically uses a $(C_X - C_{zero})/C_{ref}$ capacitance to digital conversion technique. Because of the design of the pressure sensing element 10, this conversion technique can produce significant non-linearity error. The error results because an applied pressure is linear with the change in gap height of the pressure sensing element 10, however the change in capacitance of the pressure sensing element 10 is inversely proportional to the change in gap height. Therefore, it is $(1/C_X)$ that is linear with the applied pressure.

Hardware conversion of $C_X$ results in approximately 5% FS to 15% FS for the pressure sensing element 10, where FS represents "full span." As used herein, the span on a pressure axis is the full scale pressure range of a device (e.g., for a 0 to 100 psi device, the span is 100 psi; for a 200 to 500 psi device, the span is 300 psi). The span on the device output axis is the full scale output range (e.g., for a 0.5V to 4.5V device, the span is 4.0V).

A hardware conversion of $(1/C_X)$ produces minimal non-linearity relative to pressure, in the order of 0.3% FS to 1% FS for the pressure sensing element 10. Using this hardware conversion of $(1/C_X)$ reduces the non-linearity error enough to enable two point calibration of the relationship between pressure and capacitance. Using the $C_X$ conversion result requires a four point calibration and $3^{rd}$ order polynomial correction to reduce the non-linearity error to an acceptable error.

More specifically, in the $C_X$ conversion technique, the IC 30 converts $C_X/C_{ref}$, or more precisely, $(C_X-C_{zero})/C_{ref}$. In calibration, the $C_X$ value is mapped to a linear output function as shown in Equation 1 below.

$$\text{Out}(C_X) = \left\{\frac{C_H - C_L}{P_H - P_L}\right\} * Pin + C_L - \left\{\frac{C_H - C_L}{P_H - P_L}\right\} * P_L \quad (1)$$

$P_L \longrightarrow$ 5% to 15% Non-Linearity with *Sensata* type *CSE*

If the stimulus vs. $C_X$ relationship is linear, the output function will be linear vs. the stimulus as well. Any residual non-linearity can be corrected with a polynomial of the form shown in Equation 2 below.

$$\text{Sensor Out} = A*(C_X)^3 + B*(C_X)^2 + D*C_X + E \quad (2)$$

However, if there is significant variation in the non-linearity, use of the polynomial shown in Equation 2 above requires $3^{rd}$ or even $4^{th}$ calibration point to achieve acceptable performance. The additional points can be inferred if the variation in non-linearity error is small device to device. If the variation is large it is difficult to adequately compensate large non-linearity error without additional data points.

In the present invention, the IC 30 executes a linear mapping function of the $1/C_X$ after $C_X$ is captured. This is based on a relationship shown in Equation 3 below.

$$\text{Out}\frac{1}{(C_X)} = \left\{\frac{\frac{1}{C_H} - \frac{1}{C_L}}{P_H - P_L}\right\} * Pin + \frac{1}{C_L} - \left\{\frac{\frac{1}{C_H} - \frac{1}{C_L}}{P_H - P_L}\right\} * P_L \quad (3)$$

$P_L \longrightarrow$ 0.3% to 1.0% Non-Linearity with *Sensata* type *CSE*

$$\text{Let } \left\{\frac{\frac{1}{C_H} - \frac{1}{C_L}}{P_H - P_L}\right\} = M, \quad (4)$$

$$\text{Therefore } \frac{1}{C_X} = M * Pin + \frac{1}{C_L} - M * P_L$$

$$\text{Solve for } Pin, \; Pin' = \frac{1}{M} * \left\{\frac{1}{C_X} - \frac{1}{C_L}\right\} + P_L$$

Equation 4 above illustrates the form of the $1/C_X$ transform that is applied to the captured $C_X$ output. Applying this transform reduces the non-linearity associated with the $C_X$ conversion. Essentially, the transform is eliminating the $1/C_X$ non-linearity. The only non-linearity that remains results from a deflection of the diaphragm 60.

The equations above are written in the form $C_X=f(P)$, the sensed pressure. This is done to establish the basis for the transform. In practice, the P values are replaced with the target output values. In addition, each $C_{()}$ value is derived from the transfer function. Written this way, Equation 4 becomes the following:

Solve for $\text{Out}_X$, (5)

$$\boxed{\text{Out}_X = \frac{1}{M} * \left\{\frac{1}{C_X} - \frac{1}{C_L}\right\} + \text{Out}_L} \quad \text{Fundamental Equation}$$

$$\text{Where } M = \left\{\frac{\frac{1}{C_H} - \frac{1}{C_L}}{\text{Out}_H - \text{Out}_L}\right\}$$

And $C_{()} = CDC_{out} * C_{ref} + C_{zero}$

Variable Legend $C_X$    CDC Output value converted back to capacitance, Transform input
$C_L$    $Cx$@Low Calibration Pressure
$\text{Out}_L$    Low Calibration Output
$C_H$    $Cx$@High Calibration Pressure
$\text{Out}_H$    High Calibration Output
$\text{Out}_X$    Output from Transform (more linear calculation of $C_X$)

With this transform, the magnitude of the residual non-linearity is small enough the no compensation is required for many sensors. In addition, "class" compensation, based on a nominal non-linearity of a sense element type, becomes a viable option for many applications requiring moderate accuracy improvement.

Class compensation may also be achieved with polynomial mapping of the form shown in Equation 6 below. This is done by deriving the appropriate coefficients based on the non-linearity case and the offset and gain terms for each specific sensor.

$$\text{Sensor Out} = A'*(\text{Out}_X)^3 + B'*(\text{Out}_X)^2 + D'*(\text{Out}_X) + E' \quad (6)$$

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

What is claimed is:

1. A pressure sensor for determining pressure in an environment comprising:
   a pressure sensing element comprising: a pair of opposing ceramic plates spaced apart by a gap; a pair of parallel electrodes mounted on the pair of ceramic plates so that the electrodes oppose each other across the gap; at least one rigid glass seal allowing the pressure sensing element to be effectively coupled to the environment; an integrated circuit (IC); and a connection between the pair of parallel electrodes and the IC, wherein:

one of the ceramic plates is a flexible diaphragm, configured with respect to the other ceramic plate such that a physical change in the gap is linear with a change in applied pressure to the flexible diaphragm; the electrodes configured such that a capacitance C of the electrodes is inversely proportional to the physical change;

the pressure sensing element generates a signal indicative of pressure in the environment that is linear with the applied pressure; the IC receives the signal; the IC represents the signal as a $C_x$ value; the IC executes a linear mapping function of a $1/C_x$ value; and the linear mapping function reduces a non-linearity error resulting from an arrangement of the pressure sensing element by two point calibration of a relationship between pressure and capacitance; and wherein the linear mapping function comprises:

$$Out_x = 1/M*[(1/C_x)-(1/C_L]+Out_L, \text{ where } M=[((1/C_H)-(1/C_L))/(Out_H-Out_L)] \text{ and } C_{()}=CDC_{out}*C_{ref}+C_{zero}, \text{ wherein:}$$

$C_x$ is a CDC output value converted to capacitance;
$C_L$ is $C_x$ at a low calibration pressure;
$Out_L$ is a low calibration output
$C_H$ is $C_x$ at a high calibration pressure;
$Out_H$ is a high calibration output; and
$Out_x$ is an output from the transform.

2. A pressure sensor comprising:

a pressure sensing element comprising a ceramic diaphragm plate and a ceramic substrate plate spaced apart by a gap, a pair of parallel electrodes mounted on the ceramic diaphragm plate and the ceramic substrate plate opposing each other across the gap, at least one rigid glass seal, and a connection between the pair of parallel electrodes and an integrated circuit (IC), wherein:

the ceramic diaphragm plate is a flexible diaphragm configured with respect to the ceramic substrate plate such that a physical change in the gap is linear with a change in applied pressure to the flexible diaphragm; the electrodes configured such that a capacitance C of the electrodes is inversely proportional to the physical change;

the pressure sensing element captures a signal that is linear with applied pressure; the IC receives the signal; the IC represents the signal as a $C_x$ value; the IC executes a linear mapping function of a $1/C_x$ value; and the linear mapping function reduces a non-linearity error resulting from an arrangement of the pressure sensing element to enable two point calibration of a relationship between pressure and capacitance; and the linear mapping function comprises:

$$Out_x = 1/M*[(1/C_x)-(1/C_L]+Out_L, \text{ where } M=[((1/C_H)-(1/C_L))/(Out_H-Out_L)] \text{ and } C_{()}=CDC_{out}C_{ref}+C_{zero}, \text{ wherein:}$$

$C_x$ is a CDC output value converted to capacitance;
$C_L$ is $C_x$ at a low calibration pressure;
$Out_L$ is a low calibration output;
$C_H$ is $C_x$ at a high calibration pressure;
$Out_H$ is a high calibration output; and
$Out_x$ is an output from the transform.

* * * * *